March 5, 1946.　　　R. A. KASER　　　2,395,969
VALVE CONTROL MECHANISM
Filed Sept. 1, 1942　　　3 Sheets-Sheet 1

INVENTOR
ROBERT A. KASER,
BY
Toulmin & Toulmin
ATTORNEYS

March 5, 1946.    R. A. KASER    2,395,969
VALVE CONTROL MECHANISM
Filed Sept. 1, 1942    3 Sheets-Sheet 2
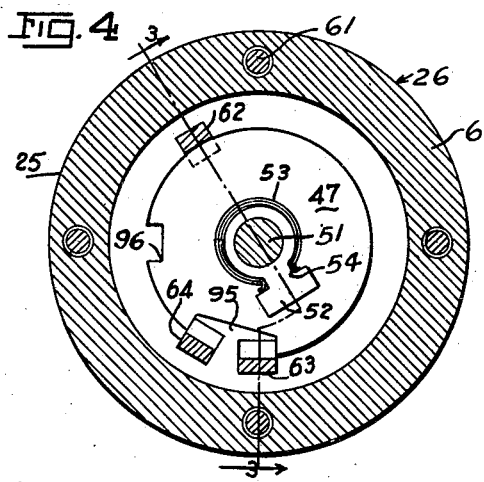
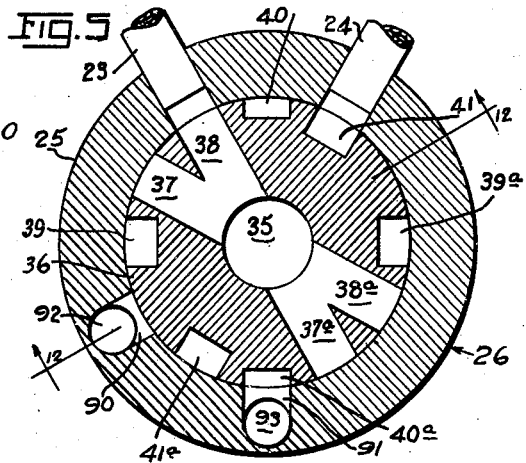
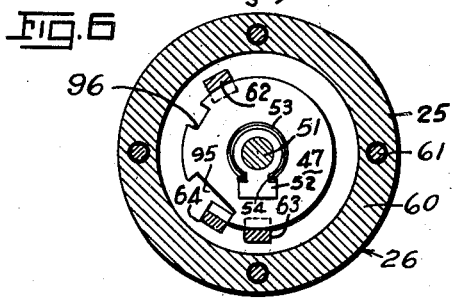
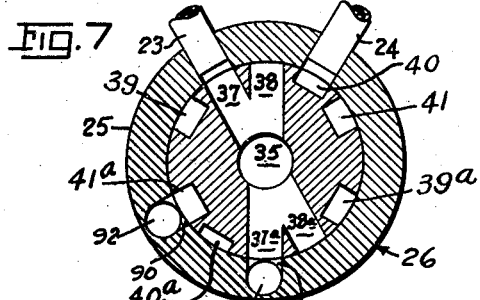
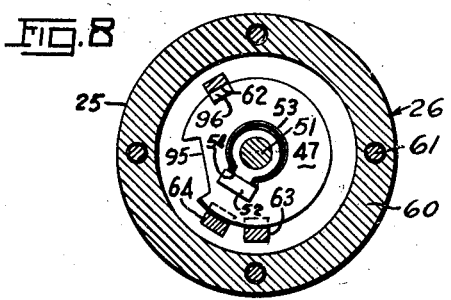
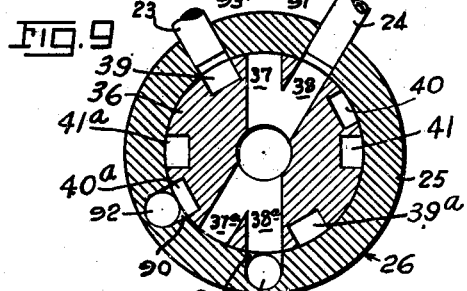
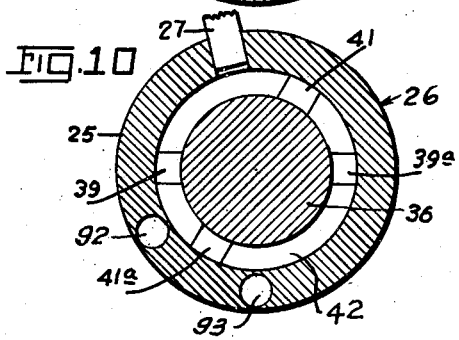
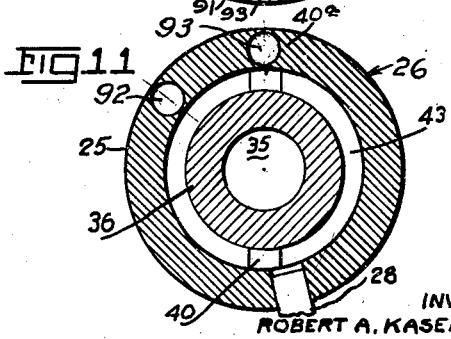
INVENTOR
ROBERT A. KASER,
BY
ATTORNEYS

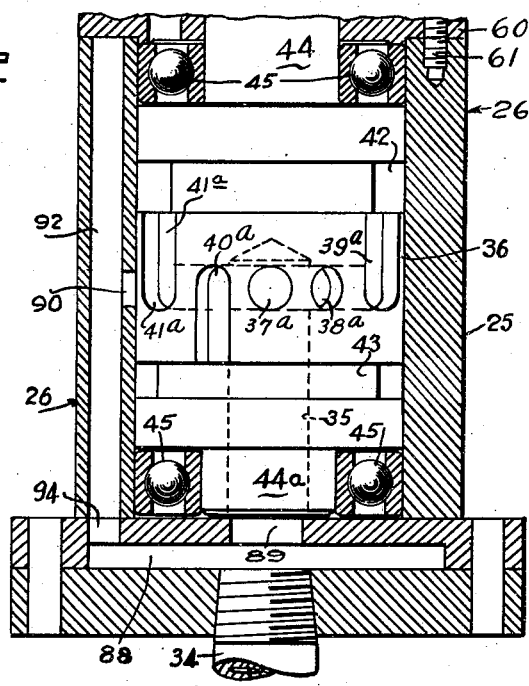

Patented Mar. 5, 1946

2,395,969

UNITED STATES PATENT OFFICE 2,395,969

VALVE CONTROL MECHANISM

Robert A. Kaser, Dayton, Ohio, assignor to The Hydraulic Development Corporation, Inc., Wilmington, Del., a corporation of Delaware Application September 1, 1942, Serial No. 456,965

6 Claims. (Cl. 74—112)

This invention relates to control mechanism and, in particular, to control mechanism for actuating a reciprocating or rotating element, such as a valve member.

It is an object of this invention to provide a control mechanism for a reciprocable or rotatable member adapted to occupy a plurality of positions, in which the shifting of said reciprocable member into its respective position is effected instantaneously, whereupon the said member is positively held in its respective position.

It is another object to provide a control mechanism for a reciprocable element, in which said element is shifted successively and instantaneously into a plurality of positions by means of reciprocable control means and is positively held in its respective position.

Another object of the invention consists in the provision of control mechanism in connection with a rotary member, in which the rotary member is moved, instantaneously and successively into three different positions and then back to its first position, while means is provided for positively holding the said rotary member in its respective positions.

It is a still further object to provide a control mechanism for a member adapted to be shifted successively into a plurality of positions, in which this shifting operation is effected instantaneously and is controlled by a reciprocable member.

These and other objects and advantages of the invention will appear more clearly from the following specification in connection with the accompanying drawings, in which:

Figure 4 is a section along the line 4—4 of Figure 3.

Figure 5 is a section through the rotary valve along the line 5—5 of Figure 2.

Figure 6 is a section similar to Figure 4, but on a smaller scale, and with the rotary valve member in a different position.

Figure 7 is a view similar to Figure 5, but on a smaller scale, showing the rotary valve member in a position corresponding to the position it occupies in Figure 6.

Figure 8 is a section similar to Figure 6, with the rotary valve member in a third position.

Figure 9 is a section similar to Figure 7, with the rotary valve member in the position corresponding to the position it occupies in Figure 8.

Figure 10 is a section through the rotary valve along the line 10—10 of Figure 2.

Figure 11 is a section along the line 11—11 of Figure 2.

Figure 12 is a section along the line 12—12 of Figure 5, showing the valve rotor in elevation.

Figure 13 shows a detail of the control mechanism.

Figure 14 is a section along the line 14—14 of Figure 13.

Figures 15 and 16 show a part of the control mechanism in two different operating positions.

General arrangement

The control mechanism according to the invention substantially comprises a reciprocable or rotatable member for movement into a plurality of positions by means of an actuating lever, which lever is connected with the said member by yielding or spring means. Locking means is provided for locking the said member in its respective position.

When the actuating lever is operated in order to bring about a shifting movement of the reciprocable or rotatable member, it loads the yielding or spring means.

When the actuating lever, during its operation, has reached a predetermined position, it causes unlocking of the reciprocable or rotatable member and, due to the loading of the yielding or spring means mentioned above, the said member will instantaneously be shifted with a snap action into its next position, at which the locking means will automatically stop it. The member then remains in this position until the next shifting operation is effected.

Structural arrangement

Figure 1:
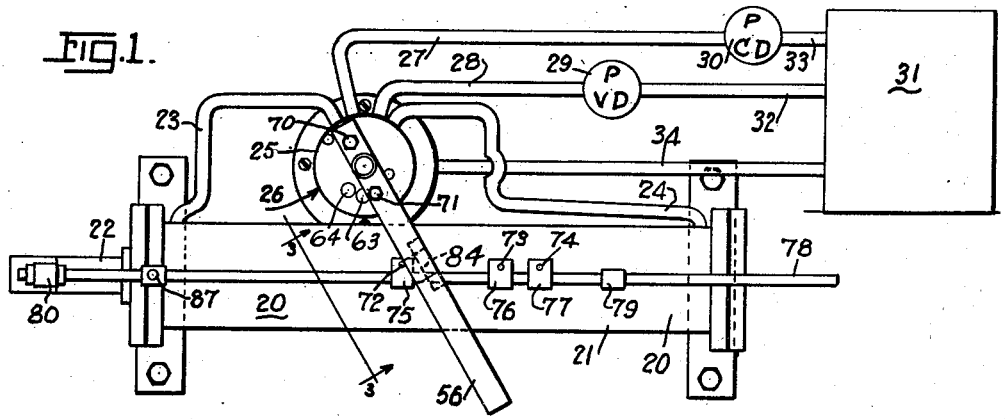
Figure 1 illustrates the invention by way of example in connection with a rotary valve and a hydraulically operable molding press.
Figure 2:
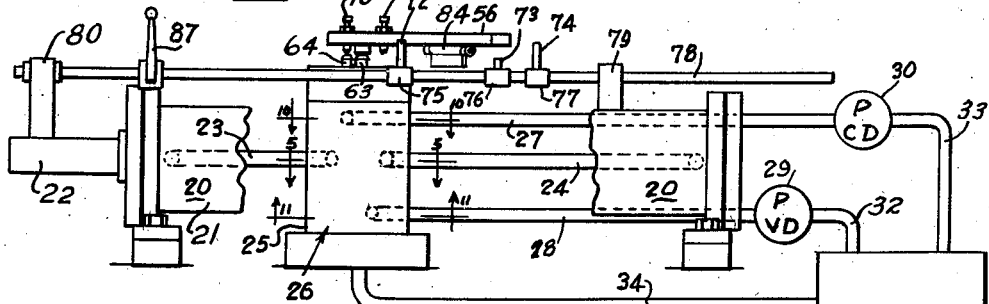
Figure 2 is a front view of Figure 1.

Referring now to the drawings in detail, the structure shown in Figures 1 and 2 comprises a molding press, generally designated 20, with a press cylinder 21, in which is reciprocably mounted a plunger 22. The plunger 22 is a double-acting plunger and is actuated by pressure fluid conveyed selectively either through a conduit 23 leading to the left end of the cylinder 21, or through a conduit 24 leading to the right end of the cylinder 21. The conduits 23 and 24 constitute service lines leading to the casing 25 of a rotary valve, generally designated 26.

Also connected with the valve casing 25 are the conduits 27 and 28, of which the high pressure line 28 leads to the pressure side of a variable delivery high pressure pump 29, whereas the low pressure line 27 leads to a low pressure constant delivery pump 30. The suction sides of the pumps 29 and 30 are connected with the fluid reservoir or tank 31 through conduits 32 and 33 respectively.

Also connected with the tank 31 is an exhaust line 34 which leads into a chamber 88 in the valve casing 25. The chamber 88 communicates through the bore 89 with the bore 35 in the valve rotor 36, which latter is rotatably mounted in the valve casing 25. Communicating with the longitudinal bore 35 are transverse passageways 37, 38, 37a and 38a, provided in the valve rotor 36. The valve rotor 36 is furthermore provided with passages or grooves 39, 40, 41 and 39a, 40a and 41a, arranged on the periphery of the valve rotor 36.

The passages or grooves 39 and 41 lead from the level of the passageways 37 and 38 to an annular recess or groove 42, which groove is connected with the conduit 27. The passage 40 leads from the level of the passageways 37, 38 to an annular recess or groove 43, which communicates with the conduit 28. The passages 39a, 41a and 40a are arranged similarly to passages 39, 41 and 40, respectively, but in diametrically opposed relationship thereto.

Furthermore arranged at the level of the passageways 37, 38, 37a, 38a and provided in the valve casing 25 are radial passageways or ducts 90, 91, which communicate with longitudinal bores 92, 93, which bores communicate through passageways 94 (only one being shown) with the chamber 88.

The valve rotor 36 has connected thereto at each end, an extension 44, 44a journalled in antifriction bearings 45. The extension 44 has arranged therein a locating pin 46, which passes through and properly locates the locking disc 47. The pin 46 also extends into the bore 48 of the T-shaped member 49. The T-shaped member 49, the locking disc 47 and the extension 44 are rigidly interconnected by means of a screw 50. Also extending into the bore 48 of the T-shaped member 49 is a shaft 51, which has its lower end rigidly connected, for instance by a pin, with another T-shaped member 52, the shape of which is similar to the T-shaped member 49.

The members 52 and 49 are interconnected by a spring 53, one end of which rests in the recess 54 of the T-shaped member 52, while the other end of the spring 53 rests in an oppositely located and similarly shaped recess in the member 52. The spring also rests in similar recesses in the T-shaped member 49.

As will be clear from the above, relative movement of the members 52 and 49 will load the spring 53 so that when the members 52 and 49 are released, the spring 53 will return the members 52 and 49 to their initial relative position, at which these members are preferably in alignment with each other.

The shaft 51 extends into a lug 55 rigidly connected with an actuating lever 56 and is, in any convenient manner, connected with the lug 55 so that rotation of the actuating lever 56 will also cause the shaft 51 to rotate. The shaft 51 is guided by a bushing 57, which latter is carried by a cover plate 58 forming a part of the valve casing 25 and connected with the valve portion 59 through a spacing or ring member 60 and threaded bolts 61.

Also passing through the cover plate 58 are three locking members 62, 63 and 64, which are provided with a flange 65, a head 66 and a notch 67 near their lower or locking ends 68. The ends 68 are preferably square and engage similarly shaped apertures in the stationary ring or casing member 60, whereby the members 62, 63 and 64 are held against rotation. Each of the upper ends of the locking members 62, 63 and 64 is surrounded by a spring 69. This spring has its lower end supported by the plate 58, while its upper end engages the head 66 and continuously urges the locking member 62 into its uppermost position, in which position the flange 65 abuts the bottom of the plate 58.

Figure 3:
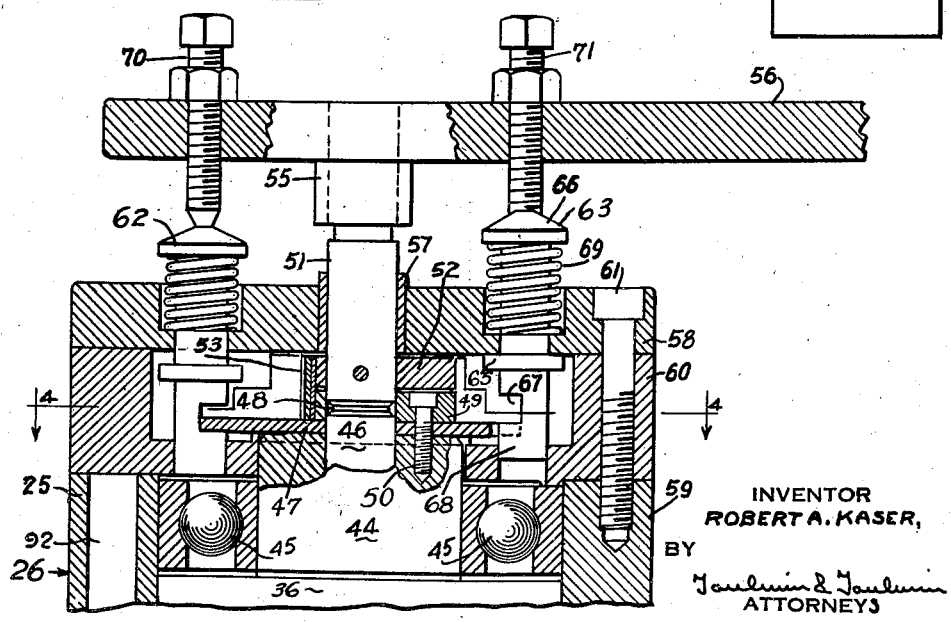
Figure 3 is a section along the line 3—3 of Figure 4.

The actuating lever 56 carries two adjustable bolts or screws 70 and 71, adapted to slide up on or to engage the heads 66 so as to compress the springs 69, thereby pressing the locking members downwardly to such an extent that the groove 67 of the respective depressed locking member comes into alignment with the locking disc 47, thereby allowing the latter to rotate in the groove 67. To facilitate the depressing operation of the bolt 70, the head 66 of each locking member is provided with a slant surface, thereby enabling the bolt 70 gradually to slide upon the head 66. Also, as shown in Figure 3, the ends of the screws 70, 71 may be tapered or rounded in order better to engage the heads 66 to depress the locking members 62, 63 and 64.

The actuating lever 56 is operated selectively by any of the pins 72, 73, 74, which are carried by blocks 75, 76, 77 respectively. These blocks are rigidly connected to but adjustably mounted on a control rod 78 which is guided by a lug 79 connected to the cylinder 21. The rod 78 is movably connected to the plunger 22 at 80, so that reciprocation of the plunger 22 will also cause the rod 78 to reciprocate. The pins 72 and 74 are of such a length that they are adapted to engage opposite sides of the actuating lever 56, whereas the pin 73 is not adapted to engage one or the other side of the lever 56.

Pivotally connected to the lever 56, by means of lugs 81, 82 and the bolt 83, is a bellcrank shaped member 84 having a normally vertically extending arm 85 adapted to be engaged by the pin 73 and also provided with a normally horizontally located arm 86 abutting the lower side of the lever 56. When the pin 73 engages the arm 85 from the right side thereof with regard to Figure 14, it will bring about shifting movement of the lever 56. However, if the pin 73 engages the arm 85 from the left side thereof with regard to Figure 14, it will merely shift the member 84 about the bolt 83, thereby sliding around the arm 85 without actuating the lever 56.

If it is desired to actuate the lever 56 manually, i. e., without the intervention of the control rod 78 and the pins 72, 73 and 74, these pins may be made ineffective by shifting the rod 78 about its longitudinal axis through a predetermined angle. This can be effected by operation of the handle 87, which handle is connected with the control rod 78 in any conventional manner so as to be able to rotate the same.

*Operation*

It may be assumed that the machine to be controlled by the control mechanism according to the invention occupies the position shown in Figures 1 and 2, i. e., that the plunger 22 is in its retracted position and that the valve rotor 36 occupies the position shown in Figure 5.

If it is now desired to carry out a working cycle of the plunger 22, according to which the plunger 22 is first advanced at a high speed and then at a lower speed, whereupon the plunger 22 is returned to its initial position at a high speed, the operator starts the pumps 29 and 30 in any conventional manner. The pump 30 then takes in fluid from the tank 31 and supplies pressure fluid through conduit 27 into the annular groove 42 from where it flows through the passage 41 in the valve rotor 36 into the conduit 24. From here the fluid passes through the right hand side of the cylinder 21 where it acts upon the plunger 22 so as to move the latter toward the left. Fluid expelled by the plunger 22 during this movement passes through the conduit 23, passageway 38, bore 35 and conduit 34 into the tank 31.

At the same time the pump 29 takes in fluid from the tank 31 through conduit 32 and delivers pressure fluid through conduit 28 into the annular groove 43 from where it flows through the groove 40a which, at this time, communicates with the passageway 91, as shown in Figure 5. Consequently, the fluid from the groove 40a passes through passageway 91 and bore 93 into the chamber 88, and flows from here through the conduit 34 to the tank 31. In other words, at this time the delivery of the high pressure pump 29 is by-passed, while the low pressure pump 30 causes the plunger 22 to perform a fast stroke toward the left.

Since, as previously mentioned, the control rod 78 is movably connected to the plunger 22, it moves along with the latter. As soon as the pin 73, during this movement of the rod 78, engages the arm 85, it begins to shift the lever 56 in clockwise direction. While this shifting movement of the lever 56 is being effected, the T-shaped member 52, which is rigidly connected to the shaft 51 and thereby to the lever 56, is likewise rotated in clockwise direction. Since, on the other hand, at this time the locking member 63 locks the locking disc 47 and thereby also the member 49, clockwise rotation of the member 52 causes loading of the spring 53.

When the lever 56 has been shifted a predetermined angle, the bolt 71 has moved up on the head 66 of the locking member 63 and depressed the latter to such an extent that the groove 67 is on the level with the disc 47. Therefore, the disc 47 is now released and since, as previously mentioned, the spring 53 was loaded, it now shifts the disc 47 in clockwise direction with regard to Figure 4 until the right hand end of the notch 95 of the disc 47 approaches the locking member 64 subsequently to be stopped thereby (see Figure 4).

Since the disc 47 is rigidly connected to the valve rotor 36, the valve rotor is shifted together with the disc 47 and now occupies substantially the position shown in Figure 7, while the disc 47 occupies substantially the position shown in Figure 6. It will be clear from the above that the shifting operation of the valve rotor 36 is effected instantaneously with a snap action. The members 52 and 49 are now again in their initial relative position. It will be understood that a slight additional movement of the lever 56 may be necessary in order to bring the right end of the notch 95 into engagement with the member 64, but that the hydraulic connections within the valve are changed instantaneously.

Since the valve rotor 36 now occupies the position of Figure 7, fluid pressure delivered by the pump 30 passes through conduit 27 into the groove 42 and from there through the passage 41a, the duct 90, bores 92 and 94, chamber 88 and the conduit 34 to the tank 31. In other words, the delivery of the low pressure pump 30 is now by-passed to the tank 31.

The delivery of the high pressure pump 29 now flows through conduit 28 into the groove 43, thence through groove 40 and from there through conduit 24 to the right hand end of the cylinder 21. Therefore, the leftward movement of the plunger 22 is continued at high pressure so that the plunger 22 now performs its actual working stroke. The fluid expelled from the left hand side of the cylinder 21 is now conveyed to the tank 31 through the conduit 23, the passageway 37, bores 35 and 89, chamber 88 and the conduit 34.

When the last mentioned shifting movement of the valve rotor 36 is started, the pin 73 is near the edge of the arm 85, and occupies substantially the position shown in Figure 15. While the leftward movement of the plunger 22 and thereby of the control rod 78 now continues, the pin 73 moves the lever 56 slightly further in clockwise direction, into the position shown in Figure 16, and thereby slides around the arm 85. In the interval during which the lever 56 moves from its Figure 15 position into its Figure 16 position, the right edge of the notch 95 engages the locking member 64 and thereby retains the valve rotor in its Figure 7 position. It will be appreciated that this shifting movement of the lever 56, beyond the position where the member 64 engages the right end of the notch 95, is only very slight and has no effect whatsoever on the position of the valve rotor 36.

When the plunger 22 approaches the end of its working stroke, the pin 74 engages the lever 56 and shifts the latter in clockwise direction, thereby again causing the member 52 to load the spring 53 in the manner described above.

When the lever 56 has been shifted a predetermined angle, the bolt 71 depresses the locking member 64 so that the latter releases the disc 47. Since the spring 53 is at this time loaded, as mentioned above, it shifts the disc 47 again in clockwise direction until the disc 47 is stopped by the locking member 62 which snaps into the notch 96 in the plate 47.

The last mentioned effected rotation of the disc 47 has resulted in a corresponding shifting movement of the valve rotor 36, which latter now occupies the position shown in Figure 9, while the disc 47 occupies the position shown in Figure 8.

Pressure fluid from the pump 30 now flows through the conduit 27 into the groove 42 from where it passes through the passage 39 and conduit 23 to the left side of the cylinder 21. Here it acts upon the plunger 22 so as to move the latter rightwardly. The plunger 22 now starts its retraction stroke. During this time fluid delivered by the pump 29 is by-passed through the conduit 28, groove 43, passage 40a, bore 92, passageway 94, chamber 88 and conduit 34. The fluid expelled from the right hand side of the cylinder 21 during this retraction stroke of the plunger 22 is conveyed to the tank 31 through conduit 24, passageway 38, bore 35, bore 89, chamber 88 and conduit 34.

When, during this retraction stroke, the pin 73 engages the left side of the arm 85 with regard to Figure 14, this will not bring about a shifting movement of the lever 56, since the pin 73 merely swings the member 84 in anti-clockwise direction about the pin 83, and thereby slides around the lower end of the arm 85.

When, near the end of the retraction stroke, the pin 72 engages the lever 56, it swings the latter in anti-clockwise direction. When the lever 56 has been moved in this direction a predetermined angle, the bolt 70 depresses the locking member 62 and moves the latter into the position shown in Figure 3. In this position the disc 47 is released and the spring 53, which was previously loaded in a manner similar to that described above in connection with the shifting of the valve rotor 36 during the forward stroke of the plunger 22, causes the valve rotor 36 to shift in anti-clockwise direction from Figure 9 position into Figure 5 position, at which position the disc 47 is stopped by the locking member 64 and is locked in position by the locking members 63 and 64. All parts of the machine now again occupy their initial position and the machine starts a new working cycle.

While the present invention has been described in connection with a valve rotor, it is, of course, understood that the invention may also be applied to other devices for controlling the position of an element which is reciprocable in its longitudinal direction. In such an instance, it is merely necessary to replace the rotary valve member of Figure 1 by a pinion meshing with a rack, which latter will then impart longitudinal reciprocative movement upon the element to be controlled.

It will be understood that I desire to comprehend within my invention such modifications as come within the scope of the claims and the invention.

Having thus fully described my invention, what I claim as new and desire to secure by Letters Patent, is:

1. In a control system, a first rotatable member, a reciprocable element operable successively to move said first rotatable member into a plurality of predetermined positions, a second rotatable member, connecting means yieldingly connecting said first and second rotatable members and adapted, in response to relative movement between said rotatable members, to store power, and also adapted, in response to the movement of said first rotatable member into one of said predetermined positions, to move said second rotatable member into its initial position relative to said first rotatable member, means for locking said second rotatable member in a plurality of positions in one direction of rotation and for permitting the uninterrupted return thereof in the opposite direction of rotation from the last of said positions to the first.

2. In a control system, a first reciprocable member, means for reciprocating said member, a second reciprocable member, means responsive to the movement of said first reciprocable member through predetermined distances in one direction successively to move said second reciprocable member into a plurality of predetermined positions, and through a predetermined distance in the other direction to move said second reciprocable member from the last of said predetermined positions to the first, and yielding means associated with said last mentioned means for making said shifting movements of said second reciprocable member in both directions substantially instantaneous.

3. In a control system, a stationary casing, a first rotatable member, actuating means associated with said member for rotating the same, reciprocable control means operable to engage said actuating means for moving said rotatable member selectively into a plurality of positions, a second rotatable member, spring means connecting said first rotatable member with said second rotatable member and adapted to be loaded by movement of said first rotatable member relative to said second rotatable member, a locking plate carried by said second rotatable member and provided with apertures, a plurality of plungers associated with said casing and arranged in overlapping relationship with said plate and in circumferential alignment with said apertures, yielding means associated with said plungers and continuously urging the same into abutting relationship with said plate or into engagement with said notches when said plungers are aligned therewith for locking said second rotatable member, means responsive to a predetermined movement of said actuating means for temporarily moving said plungers out of engagement with said notches for releasing said second rotatable member thereby to permit said loaded spring means to move said second rotatable member into a predetermined position relative to said first rotatable member.

4. In a control system, a first member movable in opposite directions, a second member movable in opposite directions along a path comprising a plurality of spaced points, retaining means operable to retain said second member in each of said points as it moves in one direction and to permit uninterrupted return thereof in the other direction, means responsive to the movement of said first member for making said retaining means ineffective, and biasing means responsive to the movement of said first member in respective opposite directions for biasing said second member in respective opposite directions, for bringing about the movement of said second member instantaneously from one position to its next.

5. In a control system, a first member movable in opposite directions, a second member movable in opposite directions along a path comprising a plurality of spaced points, a plurality of retaining means operable in one direction of movement of said second member to lock the same in the successive points of said path and, in the other direction to permit the uninterrupted return of said second member, means responsive to the movement of said first member for successively rendering said retaining means ineffective, and biasing means responsive to the movement of said first member in respective opposite directions for biasing said second member in respective opposite directions, the said biasing means being adapted substantially instantaneously to move said second member from one position to its next as said retaining means are rendered ineffective.

6. In a control system, a first reciprocable member, means for reciprocating said member, a second reciprocable member; means responsive to the movement of said first reciprocable member through predetermined distances in one direction successively to move said second reciprocable member into a plurality of predetermined positions and, through a predetermined distance in the other direction to move said second reciprocable member from the last of said predetermined positions to the first thereof, said last mentioned means comprising yielding means operable to make the shifting movement of said second reciprocable member substantially instantaneous in each of its directions of movement.

ROBERT A. KASER.